United States Patent [19]

Tamura

[11] 4,456,360
[45] Jun. 26, 1984

[54] CAMERA

[75] Inventor: Shuichi Tamura, Kanagawa, Japan

[73] Assignee: Canon Kabushiki Kaisha, Tokyo, Japan

[21] Appl. No.: 480,363

[22] Filed: Mar. 31, 1983

Related U.S. Application Data

[63] Continuation of Ser. No. 279,223, Jun. 30, 1981, abandoned.

[30] Foreign Application Priority Data

| Jul. 3, 1980 | [JP] | Japan | 55-91104 |
| Jul. 3, 1980 | [JP] | Japan | 55-91105 |
| Jul. 3, 1980 | [JP] | Japan | 55-91106 |

[51] Int. Cl.³ .......................... G03B 3/10; G03B 7/08
[52] U.S. Cl. .................................. 354/195.1; 354/402
[58] Field of Search ................. 354/25 R, 25 A, 25 N, 354/195

[56] References Cited

U.S. PATENT DOCUMENTS

| 4,205,906 | 6/1980 | Imura ................................ 354/25 N |
| 4,206,990 | 6/1980 | Imura et al. ......................... 354/195 |
| 4,243,309 | 1/1981 | Johnson et al. ...................... 354/197 |
| 4,297,015 | 10/1981 | Matsumoto et al. ................ 354/195 |
| 4,346,972 | 8/1982 | Takahashi ........................... 354/195 |

FOREIGN PATENT DOCUMENTS

| 40438 | 3/1980 | Japan ................................ 354/25 N |
| 2016155 | 9/1979 | United Kingdom . |

Primary Examiner—Russell E. Adams
Attorney, Agent, or Firm—Toren, McGeady and Stanger

[57] ABSTRACT

In a camera having automatic focus detecting means for automatically detecting an in-focus position to effect focusing of the photo-taking lens, and exposure control means for controlling the opening and closing operation of the shutter blades in accordance with object brightness, there are provided a control member arranged to control the sequence of the aforesaid focusing operation of the photo-taking lens and the aforesaid opening and closing operation of the shutter blades depending upon its position as it moves, and a driving means for moving this control member stepwise by the output of the aforesaid automatic focus detecting means or the exposure control means. Thus, the focusing operation of the photo-taking lens is automatically shifted to the exposure operation.

9 Claims, 6 Drawing Figures

CAMERA

This is a continuation of application Ser. No. 279,223, filed June 30, 1981, now abandoned.

BACKGROUND OF THE INVENTION

1. Field of the Invention:

This invention relates to improvements of the camera of the type having an automatic focus detecting device and electromagnetic release shutter, and, more particularly, to the provision of one actuator for coordination control of initiation and termination of a focusing operation by the aforesaid automatic focus detecting device and of initiation and termination of an exposure operation by the aforesaid electromagnetic release shutter.

2. Description of the Prior Art:

In the past, the cameras equipped with photo-electrically or echo-electrically operated object distance detecting devices controlling the operation of auto-focus mechanisms and with automatic exposure control apparatus using electrical actuating signals, or electrically operated shutters have been widely put into practical use.

It is also known to provide a camera equipped with an electromagnetic release mechanism rendering it possible for the electrical signal to actuate not only the above-described electric shutter but also other mechanisms within the camera.

Recently, therefore, attempts have been made to combine these functions in a single camera with an advantage that the complexity of mechanical structure and coordination control is reduced thanks to the use of electrical signals in controlling the entire operation of the camera. This leads to the possibility of improving the accuracy and reliability of control of the various portions of the camera. In the conventional camera of the type described above, it is, however, required that every portion of the camera be provided with a respective individual driver responsive to that electrical signal for producing a mechanical output signal. Since these drivers occupy a large space in the interior of the camera housing, a difficult problem arises that a further minimization of the bulk and size of the camera is no longer achieved. Further, since this driver generally takes the form of an electromagnet, or electric motor, because of its being of relatively high price, as the number of drivers in use is increased, the production cost of the camera is caused to increase. This has been one reason why such camera has a very high price.

On the other hand, however, with such situations in mind, much effort has been devoted to reduce the necessary number of the drivers, for example, electromagnets, as, for example, proposed in Japanese Patent Application No. Sho 53-63974 (Patent Application Laid Open No. Sho 54-155830). This Patent Application only discloses an improvement wherein the exposure control electromagnet is arranged so that the armature is made slidingly movable in two steps relative to the yoke with the first step initiating an exposure, and the second step terminating the exposure. Thus, the use of one driver or electromagnet suffices in controlling the sequence of the initiation and termination of an exposure-making operation of the electromagnetic release shutter. Therefore, all the above-mentioned drawbacks of the conventional camera have not been eliminated.

SUMMARY OF THE INVENTION

With the foregoing in mind, it is an object of the present invention to provide a camera having an automatic focus detecting device and an electromagnetic release shutter with the use of one driver rendering it possible to control the coordination of the initiation and termination of a focusing operation by the automatic focus detecting device and of the initiation and termination of an exposure operation by the electromagnetic release shutter, thus achieving the possibility of providing a camera of simple construction at low cost while still permitting a high increase in the accuracy and reliability of coordination control.

DETAILED DESCRIPTION OF THE PREFERRED EMBODIMENTS

The present invention will next be described in greater detail in connection with an embodiment thereof by reference to the drawings.

Figure 1:
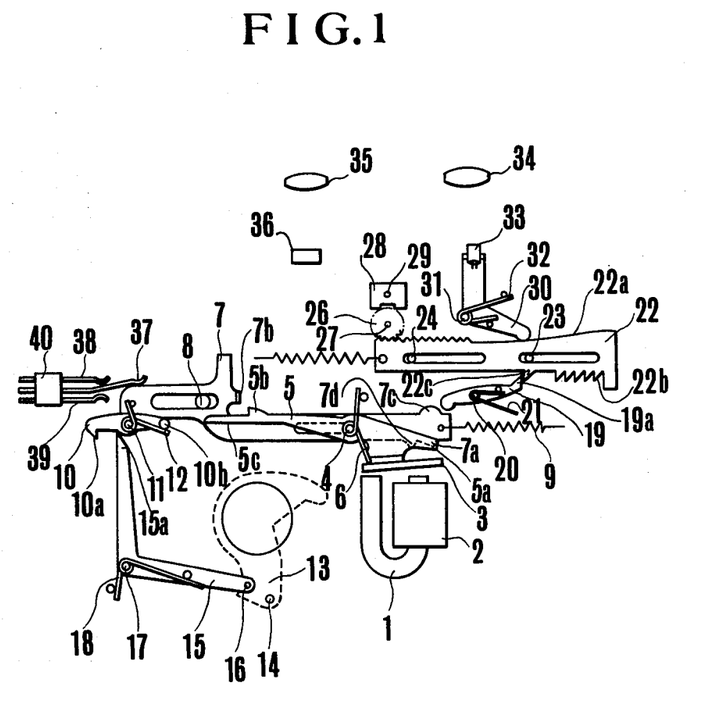
FIG. 1 is an elevational view of one embodiment of a camera according to the present invention.

In FIG. 1, there is shown a coordination control mechanism of the invention in the shutter cocked position. The reference numeral 1 denotes a magnet yoke, this magnet yoke being fixedly mounted on a shutter base plate (not shown). Again, the magnet yoke 1 is provided with a solenoid 2 upon current supply from a battery to produce a magnetic field, and cooperates with an armature 3 arranged in a slight gap from the ends of the yoke 1 in opposite relation. This armature 3 is attracted by the magnet yoke 1 when the solenoid 2 is energized, while simultaneously driving a latch lever 5 formed in unison therewith to turn about a pivot pin 4 fixedly mounted on the shutter base plate (not shown) in a clockwise direction. A spring 6 urges the latch lever 5 to turn in a counterclockwise direction as viewed in FIG. 1. Next, 7 is a control member in the form of a slide plate movable to the right as viewed in the figure as is guided by the pivot pin 4 and an additional pin 8 which is also fixedly mounted on the shutter base plate. A spring 9 urges the slide plate 7 to move to the right. This control slide 7 is provided with a first detent lug 7a arranged upon setting of the camera in the shutter cocked position to engage with a bent-off portion 5a of the armature 3-carrying latch lever 5, and a second detent lug 7d arranged upon termination of a first cycle of attracting and removing operation of the armature 3 by the yoke 1 to engage with the bent-off portion 5a, these lugs 7a and 7d being located in the right end portion thereof at a short distance from each other, the opposite or left end portion of which is provided with a third detent lug 7b arranged upon initiation of the first cycle of operation of the armature 3 to engage with a pawl 5b of the latch lever 5. Therefore, as the electromagnetic device 1, 2, 3 operates in one cycle, the control slide 7 makes two moves toward the right in sequence.

Next, element 10 is an opening lever pivotally mounted on the control slide 7 at a pin 11 and urged by a spring 12 to turn in a counterclockwise direction as viewed in FIG. 1. Again, the opening lever 10 has a hook 10a formed in a portion of one end thereof and arranged to engage with a shutter opening and closing lever 15 at the free end 15a thereof when the stepwise movable control slide 7 reaches the terminal end of movement in the one cycle, and has a pin 10b planted on the opposite end thereof to control the disengagement of the hook 10a from the lever end 15a as a tail 5c of the latch lever 5 strikes the pin 10b. Two shutter blades 13, though for the purpose of clarity only one is shown, are pivotally mounted on a common pin 14 which is fixedly mounted on the shutter base plate (not shown). This shutter blade 13 is provided with an elongated slot (not shown) in which is engaged a pin 16 on the shutter opening and closing lever 15, so that the position of the shutter blades 13 depends upon the movement of the lever 15. A spring 18 urges the shutter opening and closing lever 15 to turn in a counterclockwise direction about a pivot pin 17 which is fixedly mounted on the base plate (not shown). A change-over switch 40 is also arranged adjacent the left end of the control slide 7 so that its movable contact 37 is brought into electrical connection with either one of fixed contacts 38 and 39 which are connected to an automatic focus detecting circuit and a shutter control circuit respectively.

Next, an AF latch lever 19 is pivotally mounted on a pin 20 which is fixedly mounted on the shutter base plate, and is urged to a counterclockwise direction by a spring 21. This AF latch lever 19 is provided with a hook 19a at one end thereof to engage with an automatic focus adjustment control plate (hereinafter referred to as "AF control plate") at a nose 22c thereof when the focus detecting mechanism is in an initial position. The hook 19a is taken out of this engagement when the control plate 7 moves one step from the initial position, as a lump 7c of the control plate 7 pushes upward the opposite end of the AF latch lever 19.

The AF control plate 22 is guided by pins 23 and 24 fixedly mounted on the shutter base plate (not shown), and is urged to the left as viewed in FIG. 1 by a spring 25. Again, the AF control plate 22 is provided with a racked portion meshing with an escape wheel 26 of which rotation is regulated by an anchor 28 swingingly mounted on a pin 29. With this, when the AF latch lever 19 is disengaged from the nose 22c, the AF control plate 22 moves to the right at a constant speed. Then, when an in-focus condition is detected, the AF control plate 22 is arrested by the AF latch lever 19 with its hook 19a engaging one of the teeth in a toothed portion 22b in the right hand lower edge thereof.

Next, element 30 is a light projecting element lever pivotally mounted on a pin 31 which is fixedly mounted on a camera housing (not shown), and urged by a spring 32 to a clockwise direction. One end of the lever 30 is in contract with a camming surface 22a of the AF control plate 22 and the opposite end bears a light projecting element 33. Element 34 is a projection lens; element 35 is a collection lens; and element 36 is a light receiving element. These parts are fixedly mounted on the camera housing (not shown) and constitute an active type automatic focus detecting device known in the art. Since this portion of the camera is described in greater detail in Japanese Patent Application No. Sho 53-48006 (Patent Application Laid Open No. Sho 54-140532) assigned to the assignee of the present invention, no further detailed explanation is given here.

It should be pointed out that focusing of the phototaking lens is performed by means known in the art, as the AF control plate 22 moves.

Figure 6:
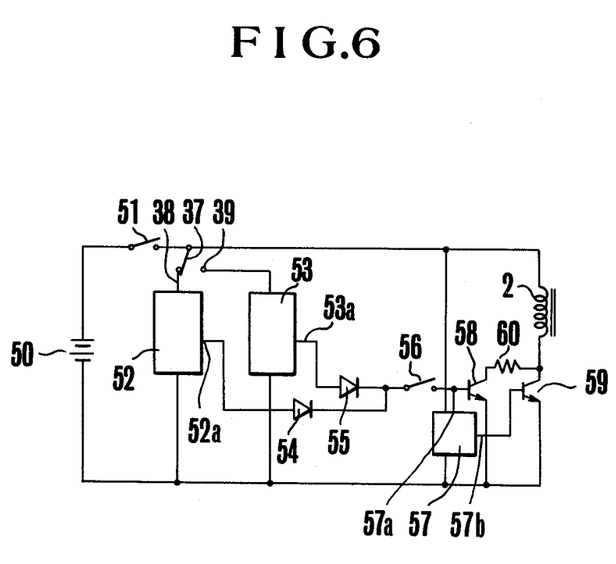
FIG. 6 is an electrical circuit diagram, partly in block form, of the camera of FIGS. 1 to 5.

FIG. 6 shows an example of an electrical circuit applicable to the present invention in block form. In this figure, element 50 is an electrical power source, or battery for supplying electrical current to the whole of this circuit through a switch 51 which is turned on when a shutter button (not shown) is slightly depressed. Another switch is formed with the above-mentioned contacts 37, 38 and 39. The contact 38 is connected to an automatic focus detecting circuit 52 having an output terminal 52 at which an output of high level is produced when current is supplied thereto. This output is changed from the high to the low level when the in-focus condition is detected. The contact 39 is connected to an exposure control circuit 53 having an output terminal 53a at which an output of high level is produced when current is supplied thereto. This output is changed from the high to the low level when the exposure is to be terminated. These output terminals 52a and 53a are connected through respective reverse-current preventing diodes 54 and 55 to a release switch 56 which is arranged to be closed when the shutter button is fully depressed. Element 57 is a circuit usually called a one-shot multi-vibrator responsive to change of its input 57a from low to high level for producing a pulse of short duration (for example, about 10ms) at its output terminal 57b. Elements 58 and 59 are transistors for impedance transformation. The transistor 58 is arranged so that with the release switch 56 turned on, when a signal of high level is applied thereto, the solenoid 2 is energized through a current limiting resistor 60 and also therethrough. On the other hand, the transistor 59 is so arranged that when the one-shot multi-vibrator 57 produces a signal of high level at its output terminal 57b, the solenoid 2 is energized therethrough.

The operation of the camera of such construction is as follows: When the shutter button is first depressed to a preliminary stroke, the power supply control switch 51 of FIG. 6 is turned on. Since, at this time, the contacts 37 and 38 engage each other as can be seen in FIG. 1, the automatic focus detecting circuit 52 is rendered operative with the production of an output of high level at the solenoid driving output terminal 52a thereof. Until this time, however, the release switch 56 remains OFF. Therefore, the various mechanisms of FIG. 1 are not actuated yet. Then, when the shutter button is further depressed, the release switch 56 is closed, thereby the solenoid 2 is supplied with a holding current (for example, in the order) of 40 to 50mA) through the transistor 58 and resistor 60, and at the same time the solenoid driving output 57b of the one-shot multi-vibrator 57 instantaneously changes to high level. Therefore, the transistor 59 is rendered conducting with the result that the solenoid 2 is supplied with a large current (for example, about 200mA) for a predetermined time.

Figure 2:
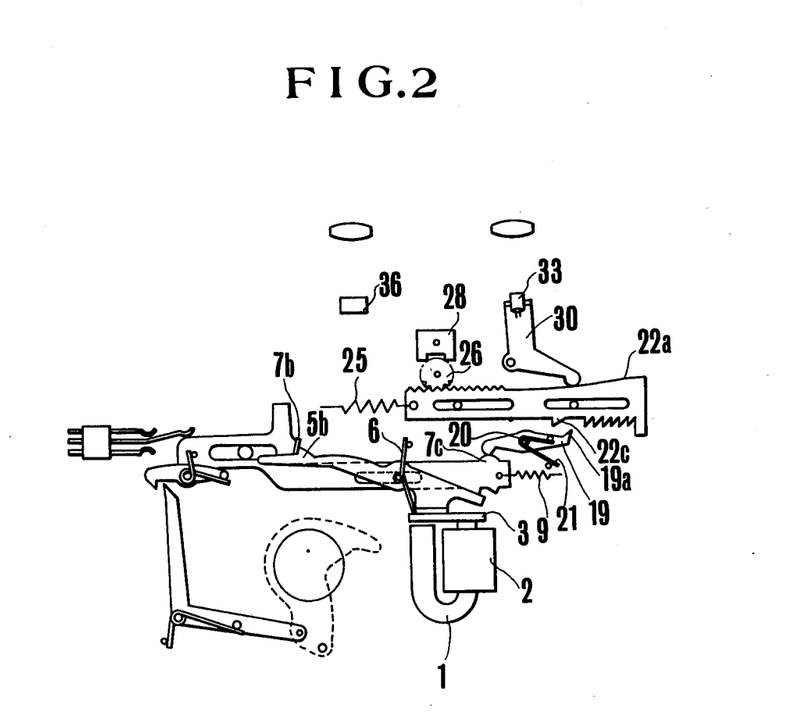
FIG. 2 is a similar view of the FIG. 1 embodiment in a position where an automatic focus detecting operation is initiated.

At this time, the magnetic force generated in the yoke 1 attracts the armature 3 as shown in FIG. 2. This causes clockwise movement of the latch lever 5 about the pivot pin 4 which in turn causes disengagement of its bent-off portion 5a from the first detent lug 7a of the control plate 7. Thus, the control plate 7 starts to move to the right as viewed in FIG. 2 under the action of the spring 9. This moving control plate 7 is then arrested by the pawl 5b of the latch lever 5 engaging with the third detent lug 7b of the control plate 7, as shown in FIG. 2. In this first stopped position of the control plate 7, the AF latch lever 19 is turned about the pivot pin 20 in the clockwise direction against the force of the spring 21, thereby the hooked portion 19a is disengaged from the nose 22c of the AF control plate 22. Then, the AF control plate 22 starts to move to the left by the bias force of the spring 25, while the speed is regulated by the mechanism of the escape wheel 26 and the anchor 28. As the AF control plate 22 moves, the lever 30 is driven to turn by the cam 22a of the AF control plate 22. Thus, the automatic focus detecting device having the light projecting element 33 and the light receiving element 36 operates to measure the object distance. The manner in which this automatic focus detecting device operates is described in the above-cited Japanese Patent Application No. Sho 53-48006 (Patent Application Laid Open No. Sho 54-140532) and therefore further discussion is believe unnecessary.

Then, when the in-focus condition is detected, the solenoid driving output 52a of the automatic focus detecting circuit 52 changes to low level at which the current supply to the solenoid 2 is cut off. Therefore the attractive force of the magnet yoke 1 on the armature 3 disappears, permitting the bias force of the spring 6 to turn the latch lever in the counterclockwise direction. Such movement of the latch lever 5 causes disengagement of the pawl 5b from the third detent lug 7b. Then, the control plate 7 starts to move again under the action of the spring 9.

Figure 3:
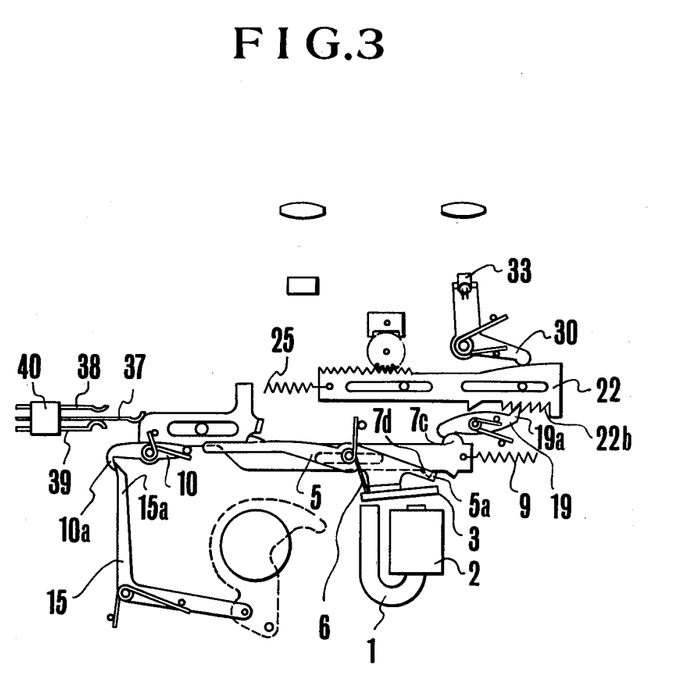
FIG. 3 is a similar view of the FIG. 1 embodiment in a position where the focus detecting operation is terminated.

This movement of the control plate 7 continues until the bent-off portion of the latch lever 5 engages with the second detent lug 7d of the control plate 7 as shown in FIG. 3. Meanwhile, as this control plate 7 moves to the right, the hump 7c of the control plate 7 is moved away from the AF latch lever 19, permitting the AF latch lever 19 to turn in the counter-clockwise direction under the action of the spring 21, and therefore causing the moving AF control plate 22 to be arrested by the hooked portion 19a of the AF latch lever 19 engaging with one of the teeth 22b of the AF control plate 22. Thus, the photo-taking lens (not shown) is sharply focused on the given object.

Figure 4:
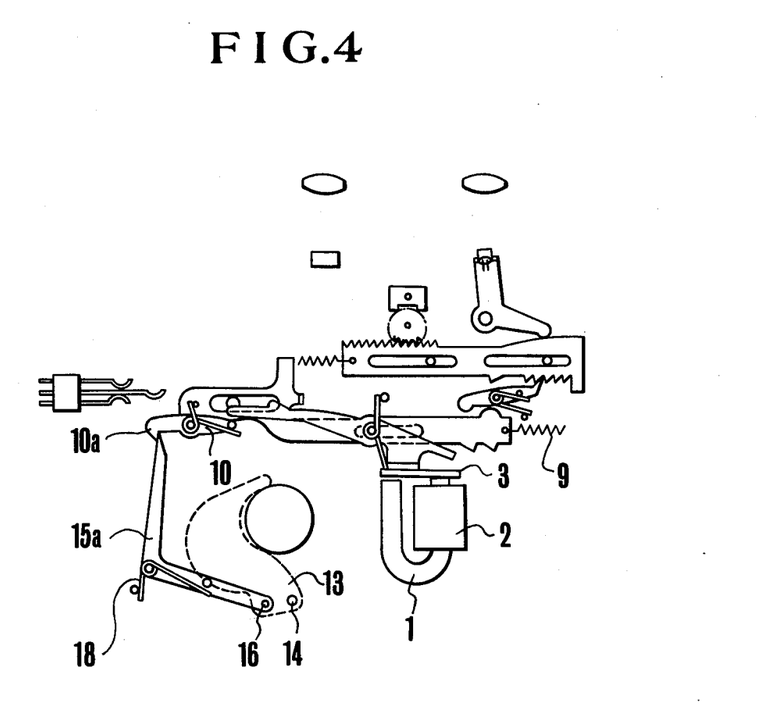
FIG. 4 is a similar view of the FIG. 1 embodiment in a position where an exposure operation is initiated.

Such movement of the control plate 7 also causes the movable contact 37 of the changeover switch 40 to be taken out of the engagement with the fixed contact 38 and to be brought into engagement with the other fixed contact 39. Therefore, the automatic focus detecting circuit 52 is rendered inoperative, and instead the exposure control circuit 53 is rendered operative with the production of a solenoid driving output of high level at the terminal 53a thereof. Thus, the input of the one-shot multi-vibrator 57 has, because of the release switch 56 remaining closed, to be changed to low level instantaneously and then to be changed to high level again. Therefore, the output 57b takes the high level for a predetermined time so that the solenoid 2 is energized again. Then, the armature 3 is attracted by the magnet yoke 1. Since, even after the impulse of energization, the holding current continues flowing through the transistor 58 to the solenoid 2, the armature 3 is maintained in the attracted position shown in FIG. 4.

Figure 5:
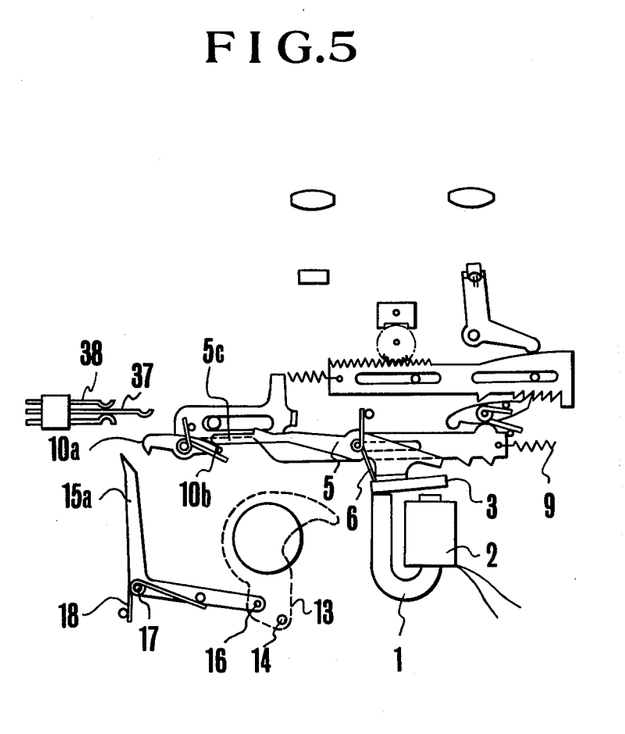
FIG. 5 is a similar view of the FIG. 1 embodiment in a position where the exposure operation is terminated.

Such second time attraction of the armature 3 causes disengagement of the bend-off portion 5a of the latch lever 5 from the detent lug 7d of the control plate 7. Then the control plate 7 starts to move to the right under the action of the spring 9. Also, at this point in time the hooked portion 10a of the opening lever 10 on one end of the control plate 7 is in engagement with the free end of the shutter opening and closing lever 15. Therefore, as the control plate 7 moves, the shutter opening and closing lever 15 is turned in the clockwise direction. Such movement of the lever 15 causes the shutter blade 13 to be turned about the pivot pin 14 in the counterclockwise direction, thus initiating an exposure. Then, when the amount of exposure reaches the correct values as detected by the exposure control circuit 53, the solenoid driving output 53a changes to low level at which the energization of the solenoid 2 is terminated. Since the attractive force of the magnet yoke 1 on the armature 3 disappears, the latch lever 5 is then turned in the counterclockwise direction by the bias force of the spring 6, as shown in FIG. 5. At this time, the pressing portion 5c of the latch lever 5 pushes down the pin 10b on the opening lever 10, thereby the hooked portion 10a is disengaged from the shutter opening and closing lever 15 at the free end 15a thereof. As a result, the shutter opening and closing lever 15 is turned in the counterclockwise direction under the action of the spring 18. Responsive to this, the shutter blades 13 are also turned to the initial position, thus terminating the exposure.

The foregoing procedure which follows the depression of the shutter button has completed a series of the automatic focus detecting operation and the shutter opening and closing operation. After that, a charge mechanism (not shown) is actuated to reset the control plate 7 and AF control plate 22 to the initial positions of FIG. 1.

It will be appreciated that the present invention is directed toward a camera having automatic focus detecting means for automatically detecting the in-focus condition to effect focusing of the photo-taking lens, and having exposure control means for controlling the period of actuation of the shutter blades in accordance with the level of object brightness. It is intended to provide for such camera with a control member having different operative positions for sequential control of the above-described focusing operation of the photo-taking lens and the above-described opening and closing operation of the shutter blades, and with driving means responsive to the output from the above-described automatic focus detecting means or exposure control means for moving that control member stepwise. The use of such coordination control of the focusing operation of the photo-taking lens and the exposure operation makes it possible to simplify the structure of this type camera and also to improve the accuracy and reliability of coordination control. Another advantage of the present invention is that one control member not only suffices to control the distance measuring operation of the automatic focus detecting means and the opening and closing operation of the shutter blades, but also is made to control even the current supply to the automatic focus detecting means and exposure control means so that it is insured that the current supply to the above-described individual means can be performed in an accurately timed relationship to the respective individual operation, and a faulty operation can be also prevented from occurring so as to achieve a further improvement of the reliability of control of each of the above-described operations. That is, according to the present invention, such coordination control of the camera can be performed with high accuracy and reliability by only one driving means, and therefore the otherwise necessary additional driving means and parts associated therewith can be deleted from the camera, thus allowing for a minimization of the bulk and size of the camera and a remarkable reduction in the production cost. And, as a result, the consumer public can have a camera with the automatic detecting device and electromagnetic release shutter of high performance at a low price.

It is noted that the embodiment of the present invention has been described in connection with the active type automatic focus detecting device but the present invention is not confined to the use of the active type automatic focusing device, and is applicable to cameras having the passive type automatic focus detecting device. it is also to be understood that although the illustrated embodiment of the invention combines the focus detecting device with the auto focus mechanism through the common driving means, the focus detecting operation for example, may be performed by the use of other means, leaving the auto-focus mechanism and the electromagnetic release shutter only to remain cooperative with that one driver.

What is claimed is:

1. A camera, comprising:
   (a) electromagnetic means;
   (b) a latching member which is shifted from a first state to a second state as power is supplied to said electromagnetic means and which returns from the second state to the first state as the power supply to the electromagnetic means is stopped;
   (c) a control member which moves in a prescribed direction as an engagement thereof with the latching member is released and passes through a first position, a second position and a third position in said order by said movement, said control member being latched at the first position and the third position when the latching member is at the first state and is latched at the second position when the latching means is at the second state;
   (d) a focus adjusting mechanism which initiates a focusing operation as the control member is shifted from the first position to the second position, and stops the focusing operation as the control member is shifted from the second position to the third position;
   (e) a shutter mechanism which makes an exposure operation as the control member shifts itself further from the third position;
   (f) a focus adjusting circuit which initiates a power supply to the electromagnetic means corresponding to a release operation of the camera, and controls the power supply to the electromagnetic means; and
   (g) a shutter control circuit which initiates the power supply to the electromagnetic means again after the control of power supply to the electromagnetic means by said focus adjusting means has been completed, and which controls the power supply to the electromagnetic means.

2. A camera according to claim 1, in which the control member will have an associating relationship with shutter blades of the shutter mechanism when it is moved to the third position, and actuates said shutter blades to an opening direction by said movement.

3. A camera according to claim 2, in which the control member supports in a rotatable manner an associating member to place said control member and the shutter blades in an associated relationship, and allows one end of said associating member to abut on the latching member as it starts the movement from the third position on.

4. A camera according to claim 3, in which the associating member is formed so as to be engageable with a blade opening and closing member which has one end thereof associated with said shutter blades, and has said engagement thereof released as it abuts the latching member.

5. A camera according to claim 4, in which the latching member is supported in a freely rotatable manner, and at the same time has, at its one end, a checking part to check the control member at the first and the third positions and has, at the other end thereof, a checking part to check the control member at the second position.

6. A camera, comprising:
   (a) electromagnetic means;
   (b) a first latching member which is shifted from a first state to a second state as power supply to said electromagnetic means is initiated, and returns from the second state to the first state as the power supply to the electromagnetic means is stopped;
   (c) a first control member which moves in a prescribed direction as an engagement thereof with the first latching member is released, said first control member being shifted from a first position to a second position when the first latching member is shifted from the first state to the second state, and being shifted from the second position to a third position when the first latching member returns from the second state to the first state;
   (d) a second latching member which is shifted from a first state to a second state as the first control member is shifted from the first position to the second position, and returns from the second state to the first state as the first control member is shifted from the second position to the third position;
   (e) a second control member which makes a focus adjusting operation as it moves to a prescribed direction, said second control member having its movement checked by the second latching member when the second latching member is at the first state; and
   (f) a control circuit which controls the power supply to the electromagnetic means.

7. A camera according to claim 6, in which the first control member is made so as to move from the third position further in a prescribed direction.

8. A camera according to claim 7, in which the shifting of the first control member from the third position is started as the first latching member is again shifted from the first state to the second state.

9. A camera according to claim 8, in which the first control member is placed in an associating relationship with shutter blades when it reaches the third position so that an exposure operation is performed corresponding to said shifting of the first control member from the third position on.

* * * * *